(12) United States Patent
Edwards

(10) Patent No.: US 6,190,544 B1
(45) Date of Patent: Feb. 20, 2001

(54) AERATOR WITH FLOAT CHAMBER AND TURNABLE INLET

(75) Inventor: Norman Alun Lindsay Edwards, St. Asaph (GB)

(73) Assignee: Flucon Pumps Limited (GB)

(*) Notice: Under 35 U.S.C. 154(b), the term of this patent shall be extended for 0 days.

(21) Appl. No.: 09/239,582

(22) Filed: Jan. 29, 1999

(30) Foreign Application Priority Data

Jan. 30, 1998 (GB) .................................................. 9801877

(51) Int. Cl.$^7$ .................................................. B01F 03/04
(52) U.S. Cl. ........................ 210/96.1; 210/220; 210/121; 261/37; 261/76
(58) Field of Search .............................. 210/221.2, 242.2, 210/96.1, 121, 220; 261/34.1, 37, 76, 120, DIG. 75, DIG. 54, DIG. 56, DIG. 70; 441/21

(56) References Cited

U.S. PATENT DOCUMENTS

| 4,246,111 | * | 1/1981 | Savard et al. . |
| 4,280,910 | * | 7/1981 | Baumann . |
| 4,514,343 |   | 4/1985 | Cramer et al. . |
| 4,710,325 | * | 12/1987 | Cramer et al. . |
| 4,997,557 |   | 3/1991 | Andersen . |
| 5,344,563 | * | 9/1994 | Noyes . |
| 5,514,267 | * | 5/1996 | Machiya et al. . |

FOREIGN PATENT DOCUMENTS

| 2447337 | 4/1976 | (DE) . |
| 3434623 | 4/1986 | (DE) . |
| 2230204 | 10/1990 | (GB) . |
| 9901386 | 1/1999 | (WO) . |

* cited by examiner

Primary Examiner—W. L. Walker
Assistant Examiner—Terry K. Cecil
(74) Attorney, Agent, or Firm—Webb Ziesenheim Logsdon Orkin & Hanson, P.C.

(57) ABSTRACT

Described is an aerator (10) that includes a venturi chamber (18), a pump for drawing liquid into the venturi chamber from a liquid inlet, an air inlet connected to the venturi chamber for aerating the liquid drawn through the venturi chamber, and an outlet for discharging the aerated liquid. A float chamber (26) is provided for supporting the aerator in a liquid medium, e.g. a fishing lake. Preferably, the liquid inlet and the outlet are on substantially parallel axes, wherein the liquid inlet is turnable between two positions: one position where the liquid inlet takes in liquid in an opposite direction to the outlet flow and the other position where the liquid is drawn in and discharged in the same direction. A control means responsive to sensors for determining biological oxygen demand and chemical oxygen demand is also provided for controlling the speed of the pump.

15 Claims, 5 Drawing Sheets

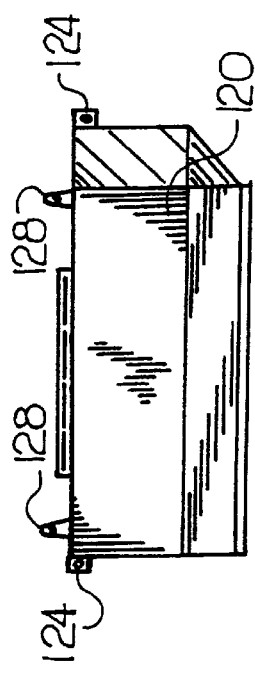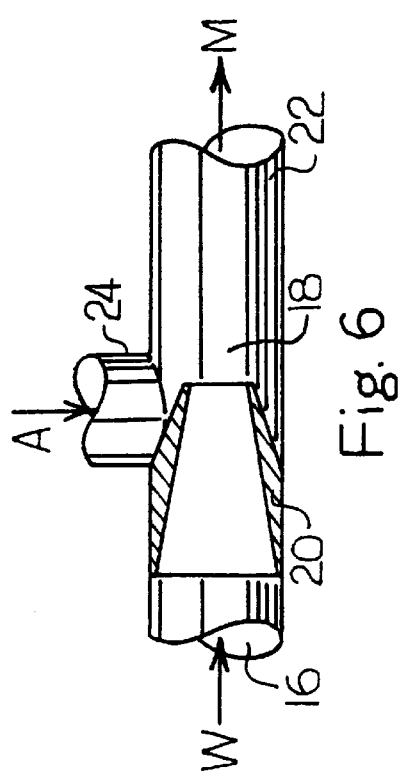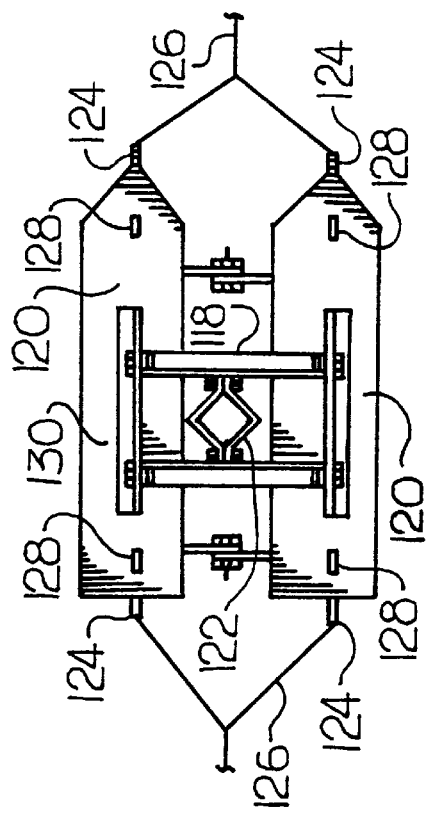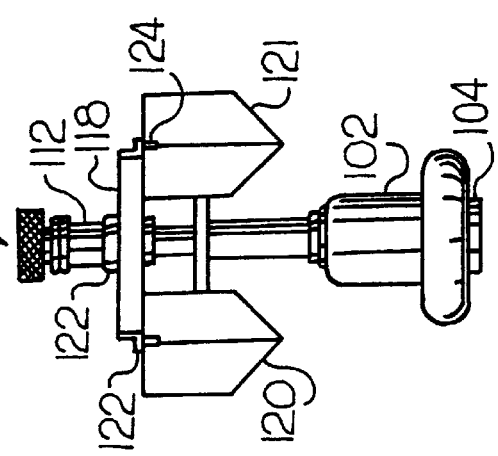

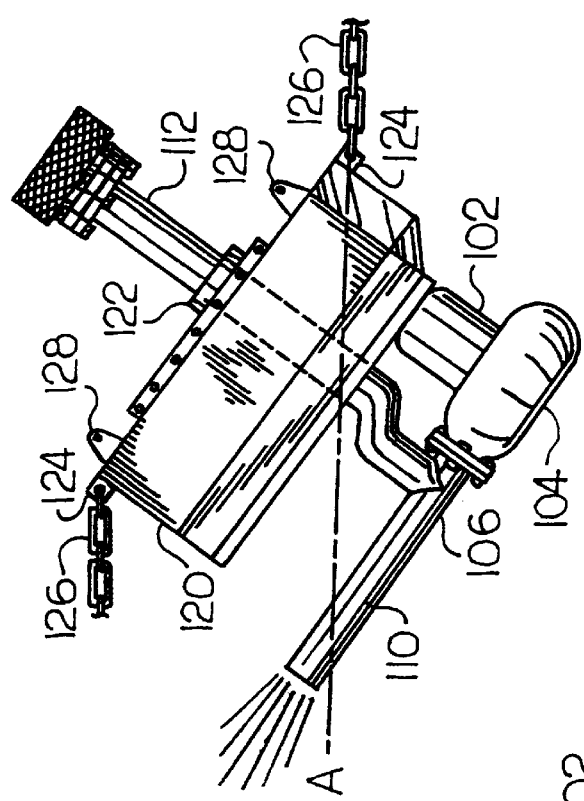
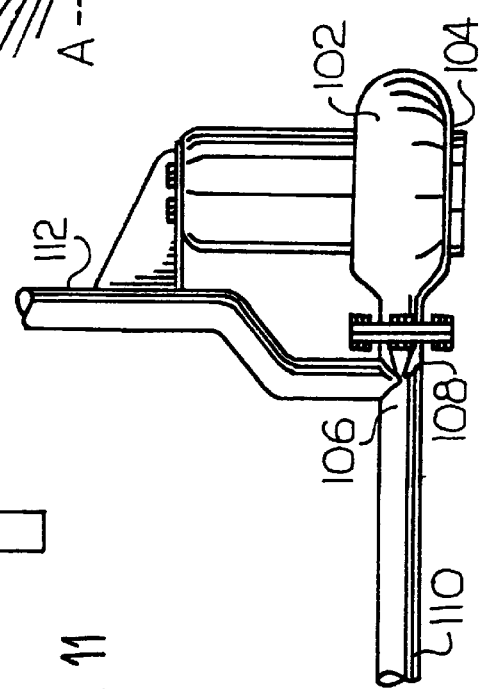
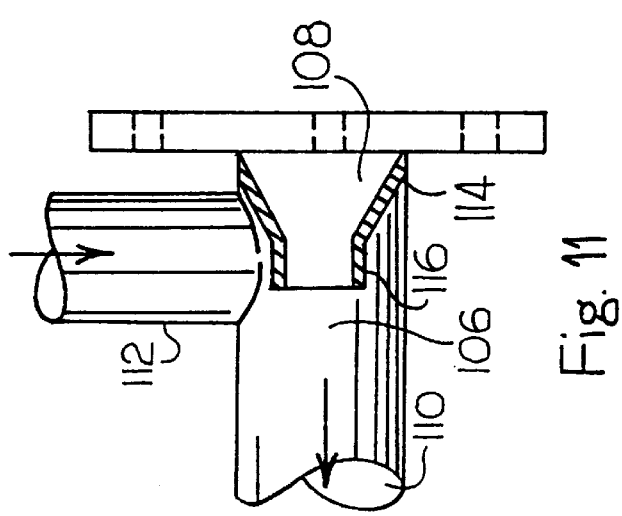

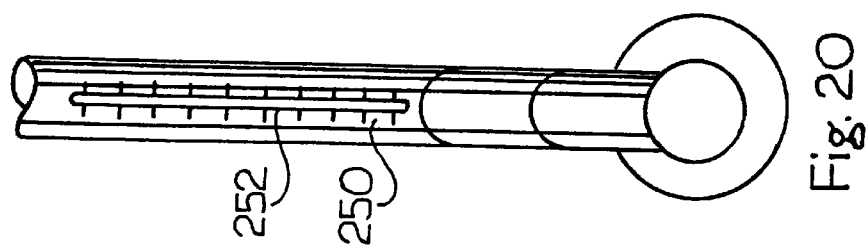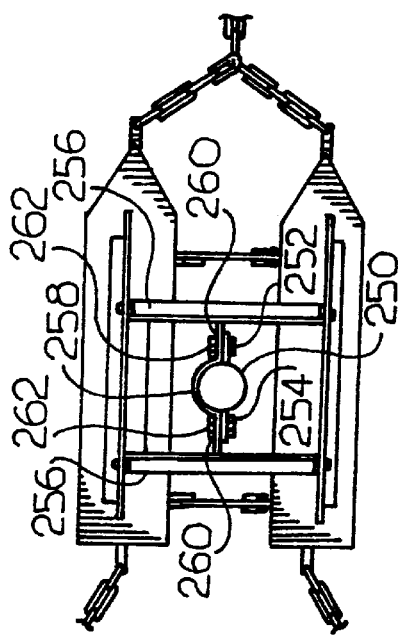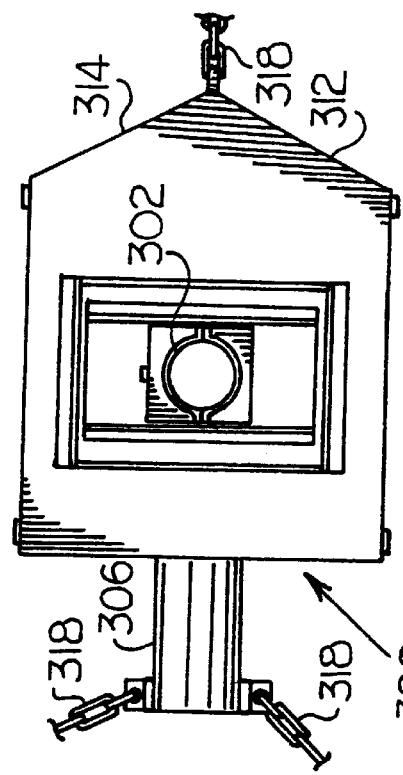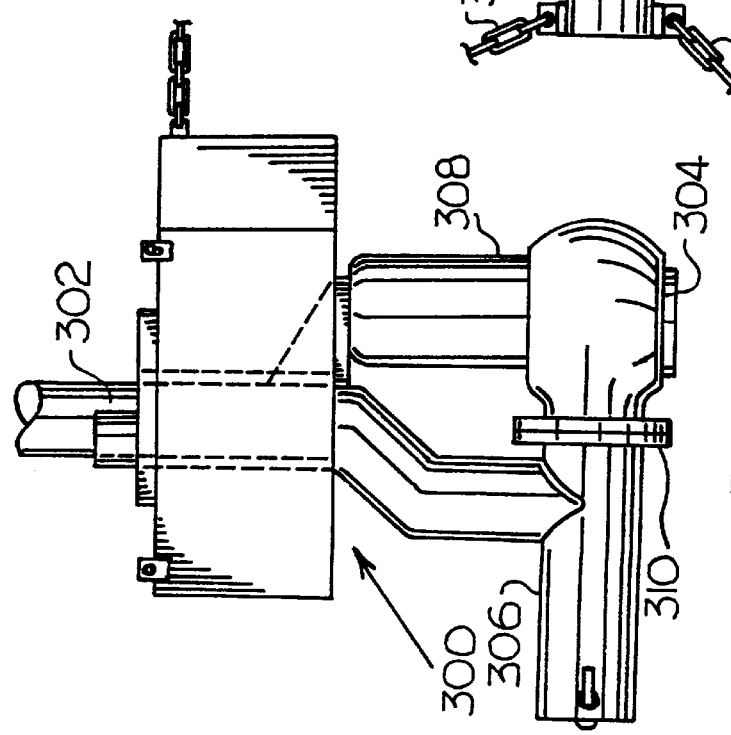

AERATOR WITH FLOAT CHAMBER AND TURNABLE INLET

BACKGROUND OF THE INVENTION

1. Field of the Invention

This invention concerns aerators.

2. Description of the Prior Art

Fishing lakes are prone to formation of algae therein. The algae removes oxygen from the water, so that the fish become lazy and do not eat. Chemical treatment is possible but this tends to sink the algae to the bottom of the lake, where oxygen is still absorbed eventually causing the fish to die. One answer to the problem of algae is to ensure that the lake is aerated although that may present practical problems. Thus, there is a need for a simple and effective aerator for use in fishing lakes.

Aerators may have applications in other situatons. In particular, aeration of effluent or sewage is advantageous in enhancing biodegradation thereof. Paddles are presently used for aeration of sewage but are heavy on energy consumption. Additionally, the gear boxes of such paddles frequently breakdown and are expensive to repair.

An object of this invention is to provide an aerator for use in a liquid medium, including solids in suspension.

SUMMARY OF THE INVENTION

According to this invention there is provided an aerator for use in a liquid medium comprising a liquid inlet to a venturi chamber, pump means for drawing liquid through the venturi chamber, an air inlet connected to the venturi chamber, whereby air is drawn into and aerates the liquid drawn through the venturi chamber, an outlet from the venturi chamber for discharging the aerated liquid into the liquid medium and float means for supporting the aerator in the liquid medium.

The liquid inlet and outlet are preferably of substantially the same cross- sectional area.

The air inlet is preferably a pipe or tube on which the float means may be mounted. For some, typically small scale, aerators it may be convenient to have a float chamber slidably mounted on the inlet tube or pipe.

Means may be provided on the inlet or the float chamber to restrict the depth of the aerator in the liquid medium relative to the float chamber.

For other, especially larger scale, aerators it may be more desirable to have the inlet pipe or tube fixed relative to the float means. In such a situation it may be convenient to have the float means clamped to the inlet tube or pipe. The float means may comprise one or more preferably two, hulls coupled together.

The liquid inlet and the liquid outlet are preferably on parallel axes and the liquid inlet is preferably below the outlet. The inlet is preferably turnable between two positions, one where the inlet takes in liquid in the opposite direction to the outlet flow. When suction and discharge of liquid are In opposite directions, the aerator is generally stabilised. In other words pull on securing means, such as anchor chain, be minimised.

Alternatively in a second position the inlet is arranged so that liquid is drawn into and discharged from the aerator in the same direction. With the inlet in the second position liquid movement through the aerator may be maximised.

The pump is preferably in a casing, so that liquid preferably flows into the pump only via the inlet. The pump means is preferably electrically operated. The power output of the pump will be chosen according to the intended use of the aerator. Typically for aerating a fishing lake, a 0.75 kw pump may be suitable. For aeration of, for example, sewage a larger capacity pump, such as a 6 kw pump, may be necessary. However, even larger capacity pumps, for example up to 60 kw may be used for heavier applications.

Control means is preferably provided for the pump means, preferably so that the pump can be controlled remotely. By controlling the speed of the pump the amount of oxygen being introduced into the liquid can be regulated. Preferably the control means is responsive to sensors for determining the biological oxygen demand (BOD) and the chemical oxygen demand (COD) of the liquid medium.

The venturi chamber preferably comprises a flow restriction tube from the liquid medium inlet. The flow restriction tube may have converging sides along its entire length or may terminate with a parallel sided section. Typically a flow restriction tube comprises a hollow frusto-conical section. The air inlet preferably connects with the venturi chamber partially behind the flow restriction tube outlet end.

The aerator of the invention operates by pumping liquid through the venturi chamber, where flow restriction causes a pressure reduction that draws air into the chamber through the air inlet where it mixes with and aerates the liquid.

Another use for aerators of the invention is in the degassing and re-oxygenation of liquids. Again this involves directing output upwardly so that gases entrained in the liquid output can escape to atmosphere from the liquid spray produced.

To facilitate degassing using an aerator of the invention, it is preferred that the aerator of the invention be tiltable relative to the float means whereby the outlet from the aerator may be upwardly directed. Preferably the aerator is connected to the float means by a mechanism allowing the aerator to be tilted to a selectable angle.

It is believed that aerators of the invention can provide considerable energy savings compared to currently used aeration systems. For example, aeration of sewage using paddles typically requires 40 kw motors to drive the paddles. However, comparable aeration of sewage may be achieved using three aerators of the invention each using only a 6 kw motor.

This invention will now be further described, by way of example only, with reference to the accompanying drawings:

BRIEF DESCRIPTION OF THE DRAWINGS

FIG. 6 is an enlarged part-sectioned view of part of the aerator of FIG. 1;

FIG. 7 is a front view of a sewage aerator of the invention;

FIG. 8 is a side view of float means for the aerator of FIG. 7;

FIG. 9 is a plan view of float means of the aerator of FIG. 7;

FIG. 10 shows the aerator of FIG. 7 without the float means:

FIG. 11 is an enlarged part-sectioned view of the aerator of FIG. 7;

FIG. 12 shows a tilted aerator for use in de-gassing, aerating and cooling fish pools;

FIG. 18 is a plan view of another aerator according to the invention;

FIG. 20 is an end view of the inlet/outlet of FIG. 19;

FIG. 21 is a plan view of a heavy duty aerator according to the invention; and

FIG. 22 is a side view of the aerator of FIG. 21.

DETAILED DESCRIPTION OF THE PREFERRED EMBODIMENTS

Figure 3:
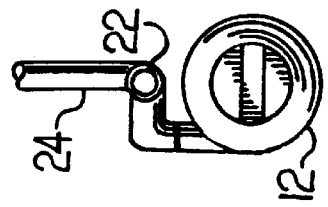
FIG. 3 is a view from the other end of the aerator of FIG. 1.
Figure 5:
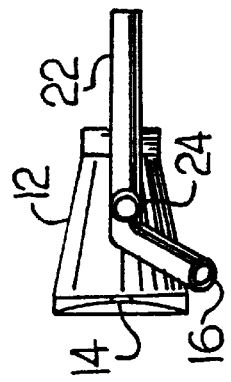
FIG. 5 is a plan view of the aerator of FIG. 1.
Figure 4:
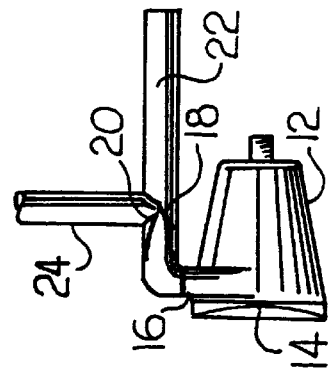
FIG. 4 is a side view of the aerator of FIG. 1.
Figure 2:
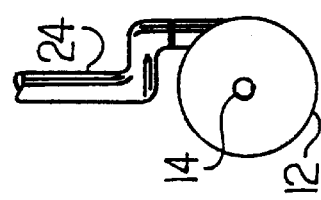
FIG. 2 is a view from one end of the aerator of FIG. 1.
Figure 1:
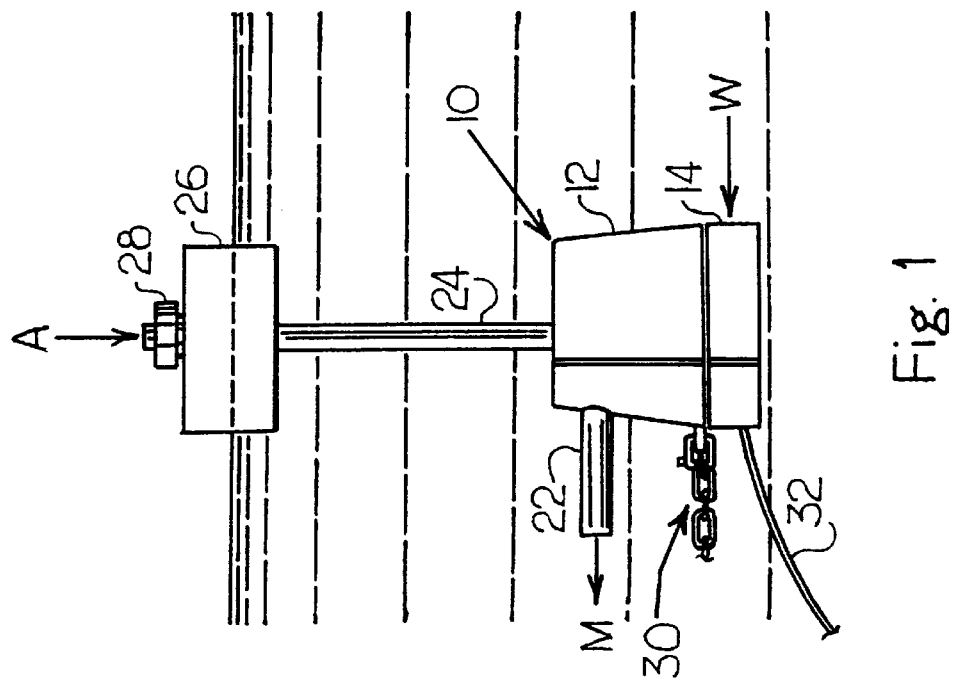
FIG. 1 shows a horizontal aerator typically for use in aerating fish pools.

Referring to FIGS. 1 to 6 of the accompanying drawings, an aerator 10 for use, for example, in aerating fishing pools comprises a pump chamber 12 containing an electrically operated pump and having a liquid inlet 14 and an outlet 16. The pump may be battery operated or a water tight electrical cable connection 32 may be made to an on-shore power supply. Typically the pump will be a 0.75 kw pump. The outlet 16 is connected to a venturi chamber 18 containing a flow restriction tube 20 which narrows over its length. The flow restriction tube 20 leads to an outlet 22. An air inlet 24 is connected to the venturi chamber partially in front of and behind, or downstream of, the flow restriction tube outlet end. The air inlet is in the form of a tube about which is slidably mounted a float chamber 26. Above the float chamber 26 on the air inlet pipe is a locking collar 28, which can be used to limit the height of the float chamber relative to the air inlet pipe.

A chain 30 is attached to the pump chamber so that it can be attached to an anchor or to shore.

The aerator 10 may be used in the following manner. Having determined the depth at which the water inlet is to be situated, the locking collar is positioned on the air inlet pipe so that the float chamber which acts upwards on the locking collar will hold the pump chamber at the desired depth. The electrical pump is switched on and this draws water through the inlet in the direction of arrow W, through the pump and into the venturi chamber before exiting through the outlet in the direction of arrow M. In the venturi chamber, the flow restriction carries a pressure drop which sucks air down the air inlet tube in the direction of arrow A into the venturi chamber where it mixes with the water to aerate it, so that the air is entrained in the water leaving the outlet.

Turning to FIGS. 7 to 11 of the accompanying drawings, an aerator 100 is shown which is designed for heavier duty purposes such as aeration of sewage. The aerator 100 comprises a pump chamber 102 containing an electrically operated 6 kw pump and having a liquid inlet 104 through the base of the chamber. The pump is connected to a venturi chamber 106 which includes a flow restriction tube 108 leading to an outlet tube 110. Connected to the venturi chamber is an air inlet tube 112 extending upwardly. The flow restriction tube 108 has a first section frusto-conical section 114 and a second cylindrical outlet section 116.

The air inlet tube 112 is fitted to a framework 118 between a pair of floating hulls 120, 121. The framework 118 includes a square section releasable clamp 122 that locates around a square section part of the inlet tube 112, so that same does not rotate due to the action of the pump. The damp 122 allows the pump chamber to be positioned at a desirable depth relative to the floating hulls.

The floating hulls 120, 121 have brackets 124 front and back, so that they can be pulled into position and anchored to shore by cables 126. The hulls 120, 121 also have lugs 128 on their top decks 130, to which lifting cables can be attached, so that the aerator can be lifted and lowered into position.

The aerator 100 is operated in a similar manner to the aerator 10 except that it is designed to use a more powerful pump rendering it more suitable for heavier liquids than water, such as sewage.

FIG. 12 illustrates an aerator as hereinbefore described in relation to FIGS. 7 to 11 of the accompanying drawings, to effect de-gassing, aeration and cooling of the water. The features of the aerator have already been described and are given the identical reference numbers for simplicity. The aerator is tilted upwards such that the outlet tube 110 extends out of the water (the water level is represented by the line A—A in FIG. 12) and is kept in the tilted position by means of the floating hulls 120, 121 and cables 126.

The tilted aerator allows water which is sucked in through the liquid inlet 104 to be sprayed out of the outlet tube 110 in the form of a fountain. This results in gases such as methane and carbon dioxide being expelled from the water. Additionally, the water gets a secondary aeration due to air being taken in as the water travels through the atmosphere.

Furthermore, the water temperature is lowered as the water is sprayed through the air resulting in a cooling of the pond or pool. This is particularly advantageous for use in the pools of fish farms during hot summer months when the increased temperature of the water often results in the death of a large number of fish.

Figure 15:
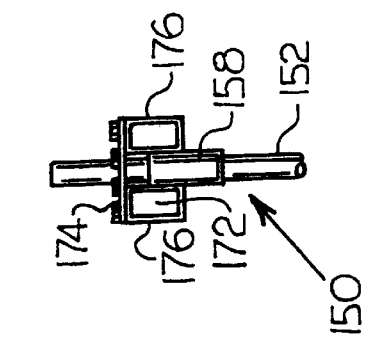
FIG. 15 is a partial end view of the aerator of FIG. 13.
Figure 14:
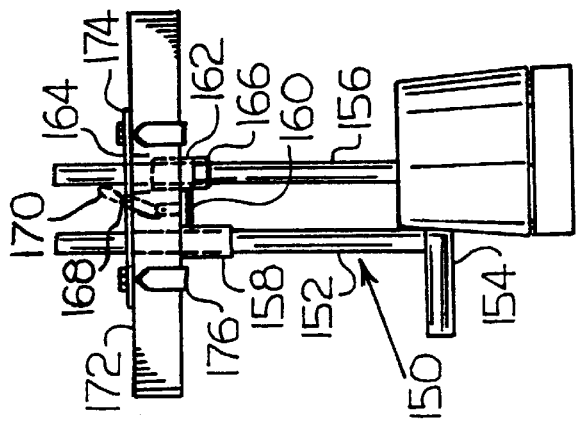
FIG. 14 is a plan view of the aerator of FIG. 13.
Figure 13:
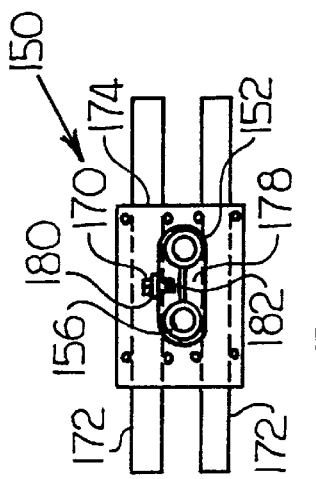
FIG. 13 is a side view of a tiltable aerator.

Referring to FIGS. 13 to 15 a tiltable aerator 150 is shown that is generally similar to that of FIGS. 1 to 6 save for its floating/tilting arrangements which only will be described in detail. A support tube 152 is mounted on outlet 154 parallel to air inlet 156. The support tube 152 has a slidable collar 158 thereon connected by a bar 160 to a slidable collar 162 on the air inlet. The collar 162 can be fixed at a desired height on the air inlet by locking rings 164, 166 above and below the collar. Extending upwardly from the bar 160 is a curved bar 168 having a series of holes 170 therethrough.

A pair of generally rectangular floats 172 are mounted under a plate 174 by means of straps 176. The plate 174 has a central aperture 178 to enable it to fit over the inlet 156 and support tube 152. At one side of the aperture 178 is mounted a bracket 180 with a hole through it. The bracket 180 is positioned so that its hole and a hole of the bar 168 can be aligned and be fixed together by a nut and bolt 182. Because the bar 168 is curved and has a series of spaced through holes, float plate can be tilted to a desired angle relative to the air inlet and fixed at that angle by aligning the bracket hole with the appropriate hole of the bar 168 and fastening them together with the nut and bolt.

For aeration the floats will usually be parallel to the outlet of the aerator but for degassing or cooling purposes it is useful to have the floats angled to the outlet, so that the outlet is directed generally upwardly.

Figure 16:
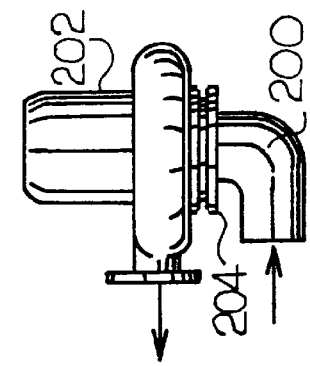
FIG. 16 is a side view of a suction diverter for aerators of the invention in one position.
Figure 17:
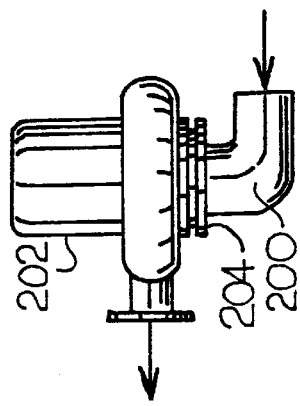
FIG. 17 shows the suction diverter in another position.

Turning to FIGS. 16 and 17 of the drawings, in previously described embodiments of the invention liquid intake has been generally upwardly into the pump chamber. However, for some purposes and indeed generally, it may be useful for liquid intake to be parallel to liquid discharge. Therefore, a suction deflector 200 can be affixed to the underside of pump chamber 202. The deflector is a generally L-shaped inlet lube having a mounting ring 204 whereby it can be mounted to take in water in the opposite direction to the discharge direction from the outlet. That arrangement is advantageous for stability of the aerator and reduces pull on anchoring means for the aerator.

On the other hand, the deflector 200 can be turned through 180° to take liquid in the same direction as the liquid is discharged from the outlet. Such an arrangement may be useful for increasing liquid movement through the aerator.

Figure 19:
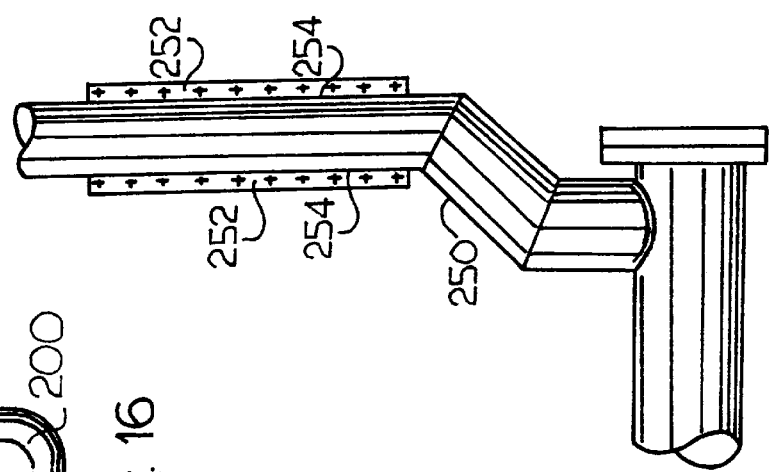
FIG. 19 is a side view of part of the inlet/outlet for the aerator of FIG. 18.

FIGS. 18 to 20 illustrate an alternative way of fixing the air inlet pipe to the floats compared to the way shown in FIG. 9. In this alternative, the air inlet pipe 250 is of circular section and has a pair of mounted flanges 252 on opposite sides of the pipe 250. Each flange 252 has a series of spaced holes 254 for fixing bolts.

Mounted between framework components 256 is a bracket 258 shaped to receive the circular section air inlet pipe. The bracket 258 has two pairs of bolt holes 260 for alignment with pairs of holes of the flanges 252 according to the desired height for the floats relative to the pump. Then the air inlet pipe is fixed to the bracket by nuts and bolts 262.

Finally, FIGS. 21 and 22 illustrate a large scale aerator 300 according to the invention. The aerator 300 has the usual air inlet 302, liquid inlet 304, liquid outlet 306, pump chamber 308 and venturi chamber 310. Float means 312 actually surround the air inlet 302 and have a prow 314. Anchoring of the float is via anchor chains 318 connected to the prow 314 and to the liquid outlet 306.

The aerator of the present invention has a wide range of applications throughout all industries. The aerator may be used for aerating fluids, de-gasing fluids, cooling fluids, and can handle solids in suspension depending upon the pump venturi design employed. The aerator can be used to keep solids in suspension rather than allowing the solids to settle on the bottom of the pool resulting in faster degradation thereof.

The aerator is cheap and easy to install requiring no special civil engineering preparation. Furthermore, the aerator can be easily removed from one expanse of water and installed elsewhere.

What is claimed is:

1. An aerator for use in a liquid medium comprising a liquid inlet to a venturi chamber, pump means for drawing liquid through the venturi chamber, an air inlet connected to the venturi chamber, whereby air is drawn into and aerates the liquid drawn through the venturi chamber, an outlet from the venturi chamber for discharging the aerated liquid into the liquid medium and float means for supporting the aerator in the liquid medium, wherein the liquid inlet and the outlet are on substantially parallel axes, and wherein the liquid inlet is turnable between two positions, one position where the liquid inlet takes in liquid in an opposite direction to outlet flow and the other position where the liquid is drawn in and discharged in the same direction.

2. The aerator as claimed in claim 1, wherein the liquid inlet and the outlet are of substantially the same cross-sectional area.

3. The aerator as claimed in claim 2, wherein the air inlet is a pipe on which the float means is mounted.

4. The aerator as claimed in claim 1, wherein the air inlet is a pipe on which the float means is mounted.

5. The aerator as claimed in claim 4, wherein the float means is a float chamber that is slidably mounted on the air inlet.

6. The aerator as claimed in claim 1, wherein the float means is a float chamber, and the aerator further includes means on the air inlet for restricting depth of the aerator in the liquid medium relative to the float chamber.

7. The aerator as claimed in claim 1, wherein the float means is clamped to the air inlet.

8. The aerator as claimed in claim 7, wherein the float means comprises two hulls coupled together.

9. The aerator as claimed in claim 1, wherein the liquid inlet is positioned below the outlet.

10. The aerator as claimed in claim 1, wherein the pump means is in a casing so that liquid enters the pump means only via the liquid inlet.

11. The aerator as claimed in claim 1, further comprising means for controlling the speed of the pump means.

12. The aerator as claimed in claim 11, wherein the control means is responsive to sensors for determining biological oxygen demand and chemical oxygen demand of the liquid medium.

13. The aerator as claimed in claim 1, wherein the venturi chamber further comprises a flow restriction tube from the liquid inlet.

14. The aerator as claimed in claim 13, wherein the air inlet connects with the venturi chamber partially downstream of the flow restriction tube outlet end.

15. The aerator as claimed in claim 1, wherein the aerator is tiltable relative to the float means.

* * * * *